United States Patent
Andou

(10) Patent No.: US 10,027,082 B2
(45) Date of Patent: Jul. 17, 2018

(54) FIBER LASER OSCILLATOR AND CLEAN BENCH MOUNTABLE TO THE SAME

(71) Applicant: FANUC CORPORATION, Yamanashi (JP)

(72) Inventor: Minoru Andou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/484,362

(22) Filed: Apr. 11, 2017

(65) Prior Publication Data

US 2017/0302046 A1  Oct. 19, 2017

(30) Foreign Application Priority Data

Apr. 15, 2016  (JP) ................................. 2016-082100

(51) Int. Cl.
  *H01S 3/067* (2006.01)
  *H01S 3/00* (2006.01)
  *H01S 3/10* (2006.01)

(52) U.S. Cl.
  CPC ........ *H01S 3/06704* (2013.01); *H01S 3/0014* (2013.01); *H01S 3/10069* (2013.01)

(58) Field of Classification Search
  CPC ............... H01S 3/06704; H01S 3/0014; H01S 3/10069; B23K 26/38
  See application file for complete search history.

(56) References Cited

U.S. PATENT DOCUMENTS

| | | | | |
|---|---|---|---|---|
| 4,578,792 A * | 3/1986 | Hoag | .................. | H01S 3/02 372/55 |
| 7,699,573 B2 * | 4/2010 | Blattner | .............. | G03F 7/70741 414/217 |
| 2004/0141534 A1 * | 7/2004 | Hashimoto | ............. | H01S 3/025 372/22 |
| 2013/0087292 A1 * | 4/2013 | Gould | .................... | B23K 9/321 160/89 |
| 2015/0266134 A1 * | 9/2015 | Hayashi | ................. | B23K 26/38 219/121.8 |

FOREIGN PATENT DOCUMENTS

| JP | 2001-343140 | 12/2001 |
|---|---|---|
| JP | 2003-60268 | 2/2003 |
| JP | 2003-83579 | 3/2003 |
| JP | 2010-54689 | 3/2010 |
| JP | WO2014/065360 | 5/2014 |
| JP | 2016-15435 | 1/2016 |

OTHER PUBLICATIONS

Notification of Reasons for Refusal dated May 29, 2018 in Japanese Application No. 2016-082100 with Machine Translation.

* cited by examiner

*Primary Examiner* — Xinning Niu
(74) *Attorney, Agent, or Firm* — Wenderoth, Lind & Ponack, L.L.P.

(57) ABSTRACT

A fiber laser oscillator includes a housing that accommodates an optical unit such that the optical unit is able to be drawn out of the housing; and a clean bench that is detachable to a side of the optical unit, and defines a closed space which is isolated from outside, in which a communication opening that is in communication with an internal space of the housing is defined in the clean bench.

11 Claims, 5 Drawing Sheets

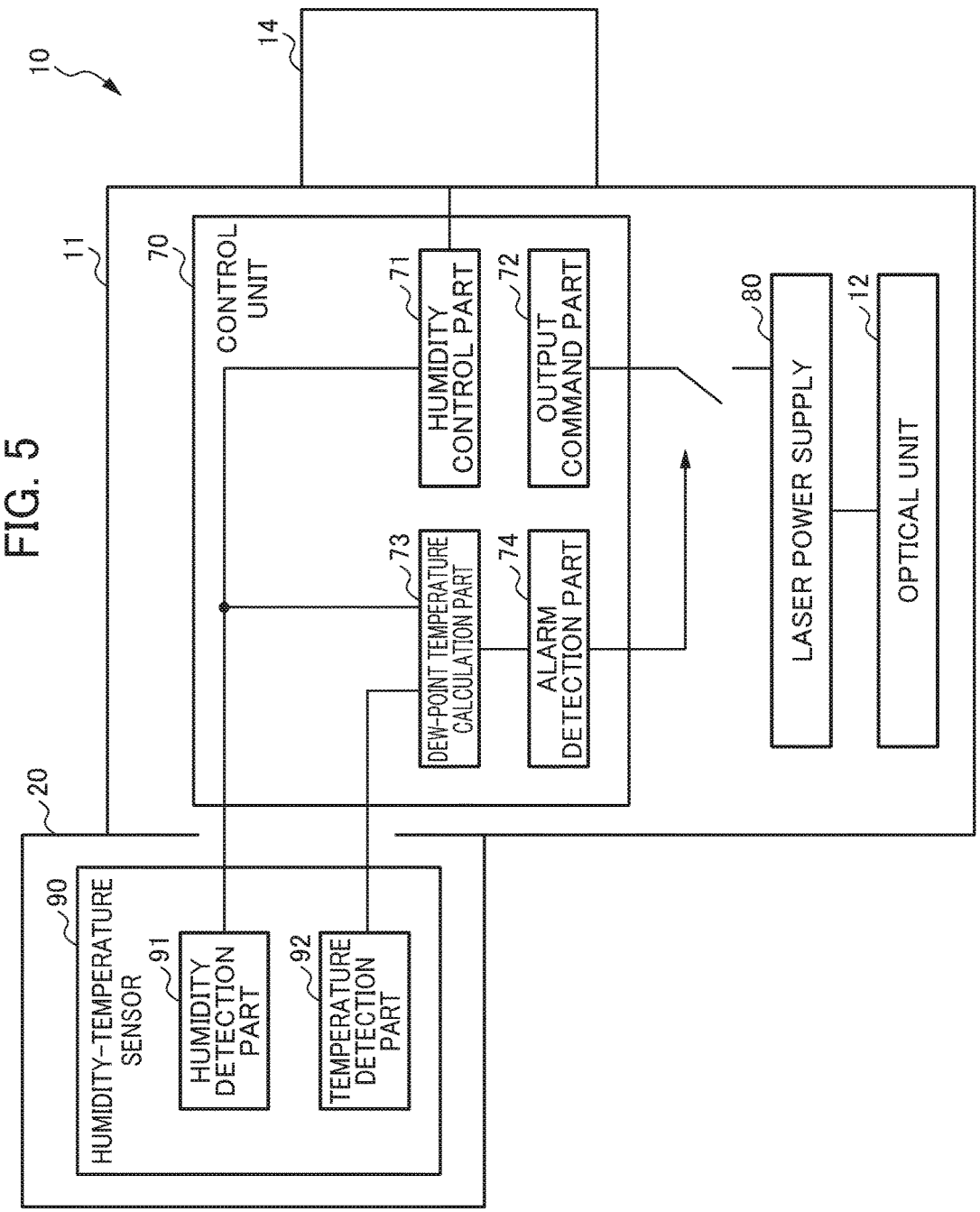

FIBER LASER OSCILLATOR AND CLEAN BENCH MOUNTABLE TO THE SAME

This application is based on and claims the benefit of priority from Japanese Patent Application No. 2016-082100, filed on 15 Apr. 2016, the content of which is incorporated herein by reference.

BACKGROUND OF THE INVENTION

Field of the Invention

The present invention relates to a fiber laser oscillator that includes an optical unit in which optical fibers are joined internally by a fusion process, and a clean bench mountable to the same.

Related Art

Conventionally, a fusion process for optical fibers using a device covering the workspace such as a clean bench has been known. For example, PCT International Publication No. WO 2014/065360 and Japanese Unexamined Patent Application, Publication No. 2010-54689 disclose technology related to this type of fiber laser oscillator. PCT International Publication No. WO 2014/065360 describes a device in which a fused part of optical fiber is arranged inside of a fusion table which is accommodated to be able to be taken out from inside an oscillator housing. In addition, Japanese Unexamined Patent Application, Publication No. 2010-54689 describes a device that includes a filtered fan at a lower part of an optical fiber connection work table, covers an upper part of the work table with a transparent cover, and fusion splices.

The fusion process is commonly performed within the clean room of a factory with the optical fiber of an optical unit mounted in a fiber laser oscillator. However, a large-scale clean bench is necessary in order to cover the table on which performing the fusion process without gaps, and thus carrying to a field site is difficult. In cases such as using a work table, since it requires to secure installation space, it is necessary to handle at length the optical fiber until the work table.

In addition, even if able to perform the fusion process within a clean booth, it has not been considered so far as removing the optical fiber, and replacing the optical components. For this reason, there is concern over dust contaminating inside the optical unit when replacing the optical components in a state taking out the optical unit of a combiner table or the like, and defects arising in optical components due to the occurrence of condensation when starting the oscillator in a state taken out of the combiner table, and thus maintenance replacement work and a verification process such as measuring the temperature of the optical components after replacement have been difficult.

SUMMARY OF THE INVENTION

The present invention has an object of providing a clean bench that can prevent failure of optical components due to intrusion of dust and moisture, and favorably enables maintenance replacement of the optical unit, verification processes after replacement, etc., and a fiber laser oscillator mounting the same.

A first aspect of the present invention relates to a fiber laser oscillator (for example, the fiber laser oscillator 10 described later) equipped with an optical unit (for example, the optical unit 12 described later) which has a fusion splicing part in which optical fibers are joined, the fiber laser oscillator including: a housing (for example, the housing 11 described later) that accommodates the optical unit to be able to be drawn out; and a clean bench (for example, the clean bench 20 described later) that is detachable to the housing or a side of the optical unit, and forms a closed space which is isolated from outside, above the optical unit that has been drawn out from the housing, in which a communication opening (for example, the communication opening 22 described later) that is in communication with an internal space of the housing is formed in the clean bench.

According to a second aspect of the present invention, the fiber laser oscillator as described in the first aspect may further include: a humidity detection part (for example, the humidity detection part 91 described later) that detects humidity inside of the clean bench; and a control unit (for example, the control unit 70 described later) that determines whether the fiber laser oscillator is operable based on a detection value of the humidity detection part.

According to a third aspect of the present invention, the fiber laser oscillator as described in the first or second aspect may further include a base plate (for example, the base plate 13 described later) that fixes the optical unit, and can be drawn out from the housing, in which the clean bench may be installed to the base plate.

According to a fourth aspect of the present invention, in the fiber laser oscillator as described in any one of the first to third aspects, the clean bench may have a visible light transmissive part (for example, the visible light transmission plate 51 described later).

According to a fifth aspect of the present invention, in the fiber laser oscillator as described in any one of the first to fourth aspects, the clean bench may have a curtain part (for example, the curtain part 52 described later) configured by a material that is visible light transmissive, which is a material having flexibility, at an outside surface differing from a portion contacting the housing.

According to a sixth aspect of the present invention, in the fiber laser oscillator as described in any one of the first to fifth aspects, the clean bench may be configured to be able to dispose a shelf (for example, the external shelf 25, internal shelf 26 described later) at an interior or exterior thereof.

In addition, a seventh aspect of the present invention relates to a clean bench (for example, the clean bench 20 described later) that is detachable to a fiber laser oscillator (for example, the fiber laser oscillator 10 described later) including an optical unit (for example, the optical unit 12 described later) having a fusion splicing part in which optical fibers are joined and a housing (for example, the housing 11 described) that accommodates the optical unit to be able to be drawn out, in which the clean bench forms a closed space isolated from outside, above the optical unit drawn out from the housing, and a communication opening (for example, the communication opening 22 described later) that communicates with an internal space of the housing is formed therein.

According to the present invention, it is possible to provide a clean bench that can prevent failure of optical components due to intrusion of dust and moisture, and favorably enables maintenance replacement of the optical unit, verification processes after replacement, etc., and a fiber laser oscillator mounting the same.

BRIEF DESCRIPTION OF THE DRAWINGS

FIG. 5 is a block diagram schematically showing a part of an electrical configuration of a fiber laser oscillator mounting the clean bench.

DETAILED DESCRIPTION OF THE INVENTION

Figure 1:
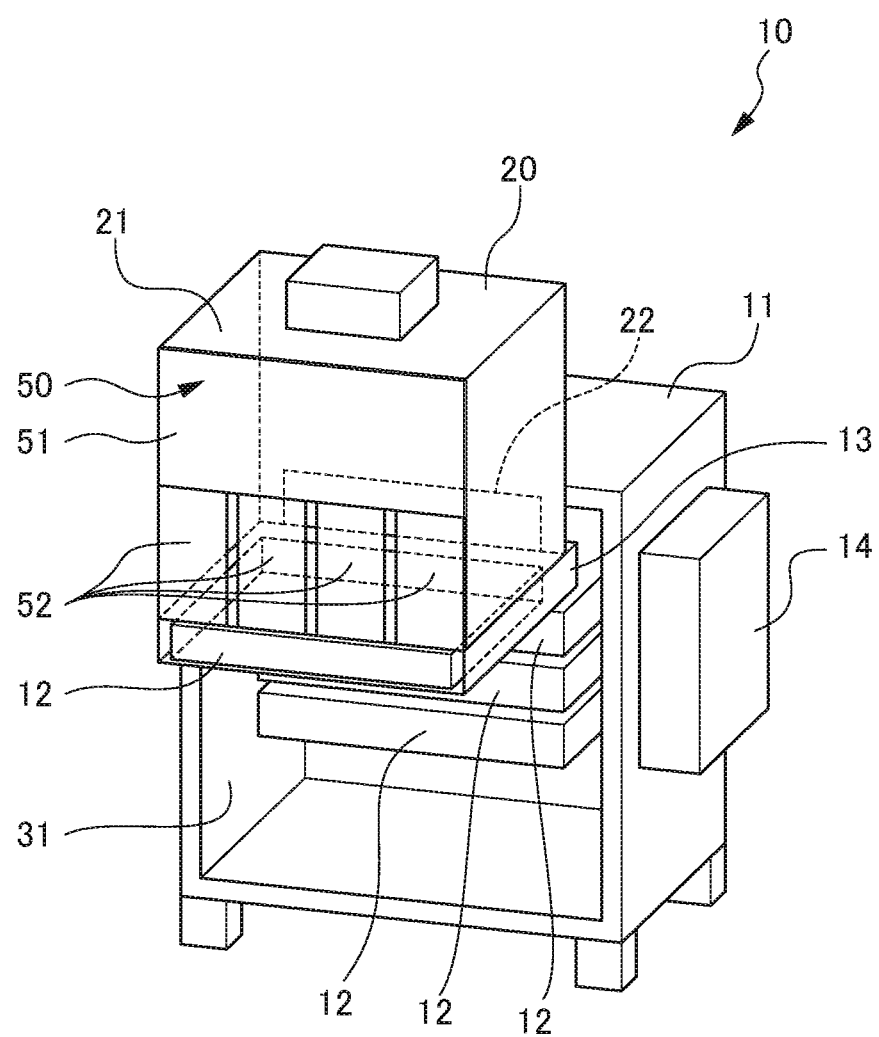
FIG. 1 is a schematic view showing a fiber laser oscillator mounting a clean bench according to an embodiment of the present invention.

Hereinafter, a preferred embodiment of the present invention will be explained while referencing the drawings. FIG. 1 is a schematic view showing a fiber laser oscillator 10 mounting a clean bench 20 according to an embodiment of the present invention.

As shown in FIG. 1, the fiber laser oscillator 10 of the present embodiment includes a housing 11, a plurality of optical units 12, a base plate 13, an air conditioner 14, and a clean bench 20.

The housing 11 has, formed at the inner side thereof, an internal space 31 accommodating a plurality of the optical units 12 for generating a laser beam. The housing 11 is configured to be able to accommodate a plurality of the optical units 12 aligned vertically.

The optical unit 12 is provided with, inside thereof, a fusion splicing part (not illustrated) at which optical fiber are fusion spliced, and the optical component, etc. are equipped thereto. The plurality of optical units 12 are also fusion spliced by various cables. It should be noted that the optical unit 12 of the present embodiment is a unit in which optical fibers are fusion spliced inside thereof, such as a fiber laser module that generates a laser beam, or a beam combiner in which a plurality of fiber lasers are connected. In addition, the optical unit 12 of the present embodiment becomes a structure in which the inside is exposed by removing the tabletop thereof.

The base plate 13 is a support member that supports the optical unit 12. The base plate 13 of the present embodiment is configured to be moveable in the horizontal direction between a housing position at which positioning the optical unit 12 inside of the housing 11, and a drawn position at which positioning the optical unit 12 supported by the base plate 13 outside of the housing 11. As the configuration allowing the base plate 13 to slidlingly move, for example, slide rails, etc. can be used. In the present embodiment, the base plate 13 is provided according to the number of optical units 12 accommodated in the housing 11.

The air conditioner 14 performs air conditioning inside of the housing 11 and clean bench 20.

The clean bench 20 is a work cover mounted to the base plate 13 that has been drawn out from the housing 11, and is configured to be removable relative to the fiber laser oscillator 10. The clean bench 20 is configured to be small scale to enable carrying as a whole.

Next, the respective configurations of the clean bench 20 will be explained. It should be noted that a surface of the clean bench 20 opposing the housing 11 will be explained as a back surface, and the opposite side to the back surface will be explained as a front surface in the following explanation.

Figure 2:
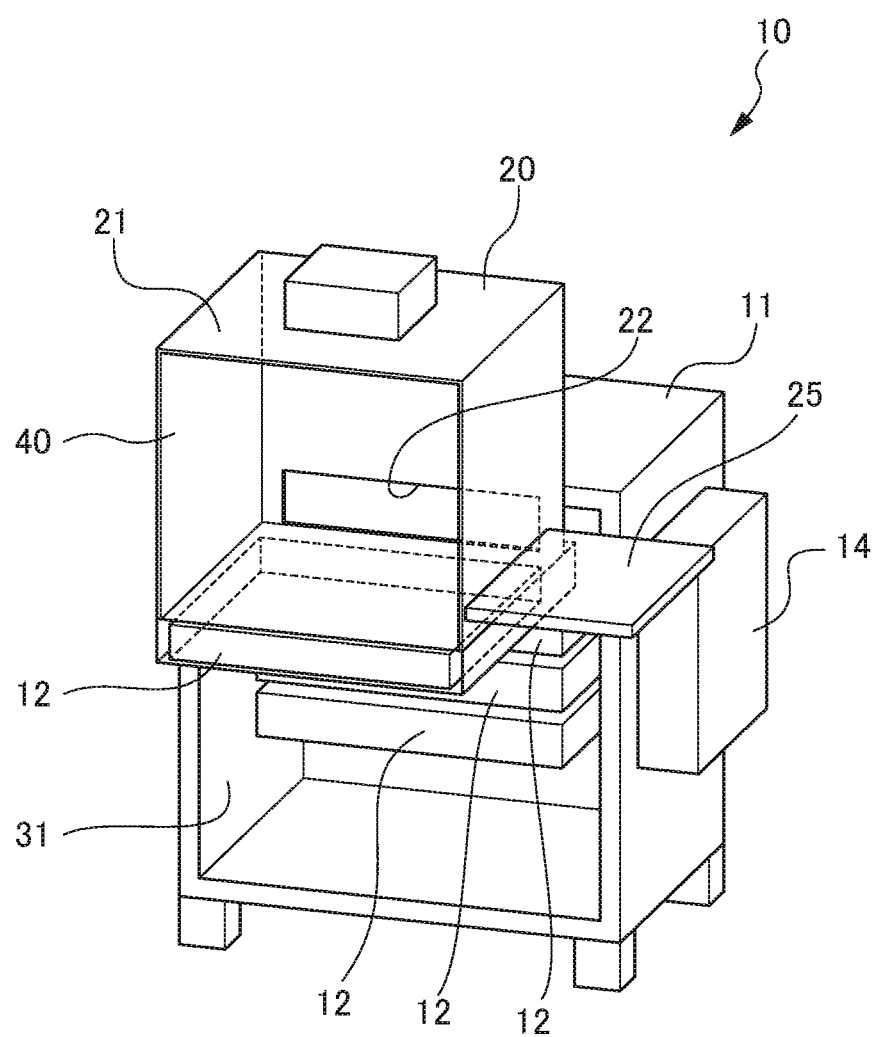
FIG. 2 is a schematic view showing a clean bench and a fiber laser oscillator in a state installing an external shelf.

The clean bench 20 of the present embodiment forms a closed space above the optical unit 12 by way of a box-like bench main body 21 in which the front surface and bottom surface are open, and a front panel installed to the open front surface of the bench main body 21 (first panel 50 in FIG. 1 or second panel 60 in FIG. 2).

The bench main body 21 has an overall shape formed in a size falling inside of the base plate 13 drawn out from the housing 11, and is installed to the base plate 13. In addition, a communication opening 22 that is in communication with an internal space 31 of the housing 11 is formed in a surface of the bench main body 21 opposing the inner side of the housing 11.

First, the first panel 50 shown in FIG. 1 will be explained. The first panel 50 is a panel for work used when performing the fusion process on optical fibers.

The first panel 50 of the present embodiment includes a visible light transmission plate 51 that is positioned at the top in a state installed to the front surface of the bench main body 21, and a curtain part 52 positioned at the bottom thereof.

The visible light transmission plate 51 is a plate member configured by a plate that is visible light transmissive. The operator becomes able to visually confirm the inside of the clean bench 20 through the visible light transmission plate 51.

The curtain part 52 is a bottom part of the first panel 50, and is arranged below the visible light transmission plate 51. The curtain part 52 is configured by a material that is visible light transmissive, which is a material having flexibility.

A long-narrow gap extending in the longitudinal direction is formed in the curtain part 52 of the present embodiment. For example, the long-narrow gap extending in the longitudinal direction in the curtain part 52 is formed by arranging horizontally a plurality of rectangular members that are vertically long and narrow, or forming a plurality of slits extending in the longitudinal direction relative to one member, or the like. By way of this gap, it is possible to configure so that the inside of the clean bench 20 is not greatly exposed to outside, even in a case of an operator pushing apart the curtain part 52 to insert a hand.

By way of the clean bench 20 consisting of the first panel 50 and bench main body 21 explained above, a closed work space is formed above the optical unit 12 supported by the base plate 13, and it becomes possible to perform maintenance work, etc. on optical units 12 in this work space. In addition, the clean bench 20 is installed via the base plate 13; therefore, it is possible to perform the work of removing the tabletop of a casing of the optical unit 12 within the closed space.

In addition, the clean bench 20 of the present embodiment is configured to be able to install an external shelf 25 arranged at the outside of the bench main body 21. FIG. 2 is a schematic view showing the clean bench 20 and the fiber laser oscillator 10 in a state installing the external shelf 25.

In FIG. 2, a state of the first panel 50 (or second panel 60 described later) being removed from the bench main body 21 is shown. In the state in which the first panel 50 is removed, it becomes a state in which the front surface is opened and the internal space 40 of the clean bench 20 is exposed, and thus replacement of the optical unit 12 or components built into the optical unit 12 becomes possible through this opening portion.

The external shelf 25 is a plate member arranged at an exterior surface of the clean bench 20. The external shelf 25 is used as a component shelf when replacing the optical unit 12 itself or optical components inside of the optical unit 12. This external shelf 25 enables placing tools required for component replacement and consumable goods for cleaning such as Bemcot on the top surface thereof. For example, the first panel 50 is removed from the bench main body 21 of the clean bench 20, and the external shelf 25 is installed to an exterior surface of the clean bench 20. Optical fibers joined to a damaged part are cleaved in this state, replacement work, etc. of the damaged part is performed, and then work to construct optical fiber inside of the clean bench 20 is advanced to.

Figure 3:
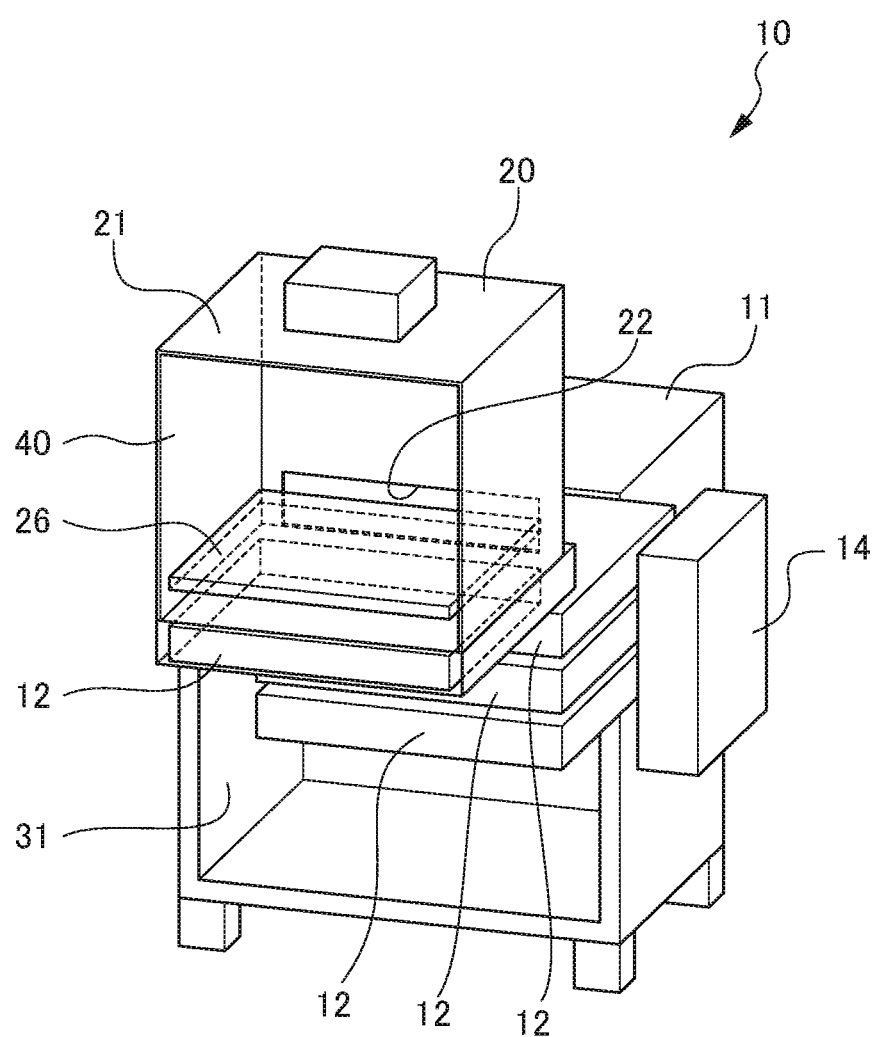
FIG. 3 is a schematic view showing a clean bench and a fiber laser oscillator in a state installing an internal shelf.

Next, the fusion process of optical fiber will be explained. In the fusion process of the present embodiment, the fusion process is performed in a state setting an internal shelf 26 inside of the bench main body 21. FIG. 3 is a schematic view showing the clean bench 20 and fiber laser oscillator 10 in a state installing the internal shelf 26. It should be noted that FIG. 3 shows a state in which the first panel 50 (or second panel 60 described later) has been removed from the bench main body 21.

As shown in FIG. 3, the internal shelf 26 is arranged above the optical unit 12 inside of the bench main body 21. At an inside surface of the internal shelf 26 of the present embodiment, a slide rail (not illustrated) is provided as a frame member supporting the internal shelf 26. When performing the fusion process, the internal shelf 26 is inserted from the front surface side to the back surface side following along the slide rail from outside to the bench main body 21 in a state in which the front surface is open, and then is fixed at an inner side of the bench main body 21. Due to being a structure that allows sliding along the frame member, a situation in which the internal shelf 26 falls down to the side of the optical unit 12 during insertion is also reliably prevented.

The working apparatus used in the fusion process, e.g., fusion machine performing the fusion process (not illustrated), is placed on the internal shelf 26 thus fixed. By way of the internal shelf 26, it is possible to perform the fusion process in a stable state, without the working apparatus or the like mistakenly falling to the side of the optical unit 12. After setting the optical fiber in the fusion machine, the first panel 50 configured to be visible light transmissive is attached to the bench main body 21, and after the degree of cleanliness inside of the clean bench 20 becomes high, the fusion process is performed.

The operator can perform work using the fusion machine while confirming the state inside of the clean bench 20 through the visible light transmission plate 51. In addition, since the curtain part 52 is arranged below the visible light transmission plate 51, it is possible to operate the fusion machine while maintaining a high degree of cleanliness. After the fusion process, the first panel 50 is removed from the bench main body 21, the fusion machine detached from the optical fiber and the internal shelf 26 are drawn out from the clean bench 20, and construction work of optical fiber is advanced to.

Figure 4:
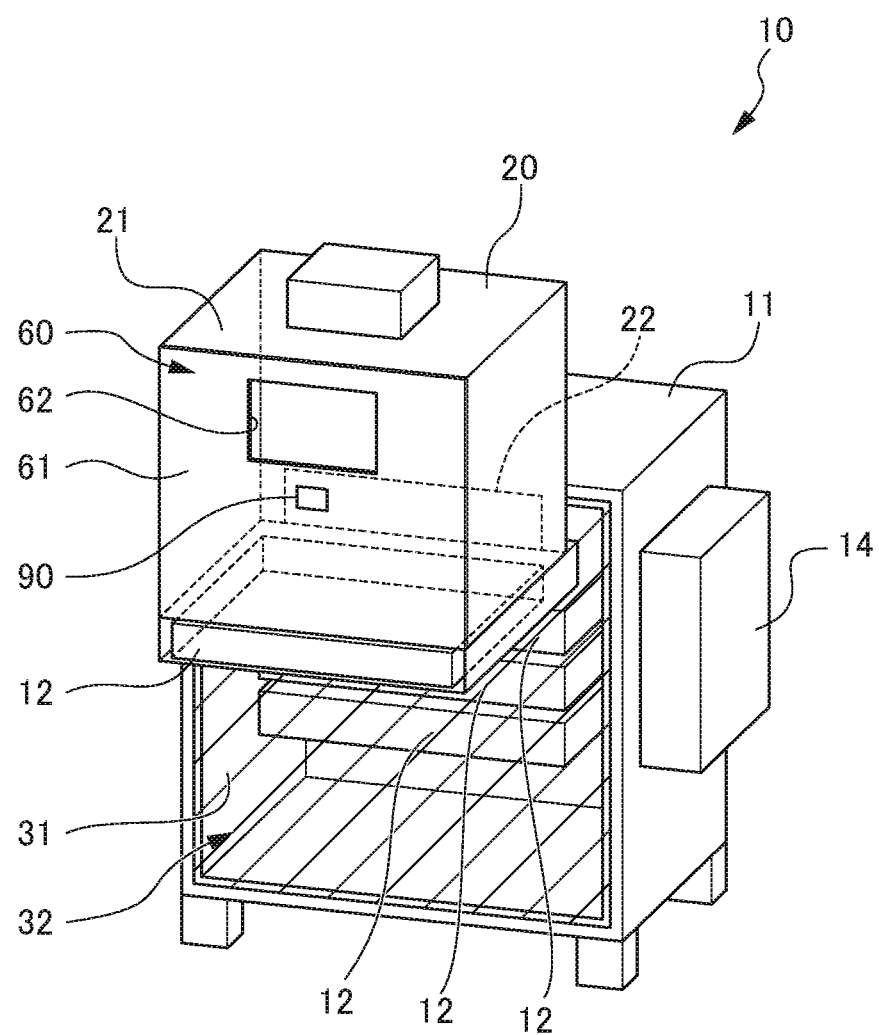
FIG. 4 is a schematic view showing a clean bench and fiber laser oscillator in a state installing a second panel.

Next, the second panel 60 used in validation of the optical fiber will be explained. FIG. 4 is a schematic view showing the clean bench 20 and fiber laser oscillator 10 in a state installing the second panel 60.

The second panel 60 of the present embodiment includes a plate-like base member 61, and a moisture-temperature sensor 90 for detecting the moisture and temperature inside of the clean bench 20.

The plate-like base member 61 is formed so as to cover the front surface of the bench main body 21. An opening 62 is formed at the top center of a planar portion of the base member 61. The moisture-temperature sensor 90 is arranged at a back side of the base plate 61. The moisture-temperature sensor 90 has a function of detecting moisture and temperature inside of the clean bench 20.

The second panel 60 explained above is installed to a front surface of the bench main body 21. As mentioned above, the inside of the clean bench 20 is in communication with the inside of the housing 11 through the communication opening 22 formed in the bench main body 21 thereof, and becomes a structure in which the inside of the clean bench 20 and housing 11 are connected in terms of humidity level.

Next, the cover member 32 of the housing 11 used in a state installing the second panel 60 to the bench main body 21 will be explained. The cover member 32 shown in the hatched region in FIG. 4 is installed so as to cover a portion of the housing 11 other than a portion hidden in the clean bench 20.

The cover member 32 is configured from a material having flexibility such as a vinyl sheet, and prevents a situation in which dust contaminates the internal space 31 of the housing 11. It is also thereby possible to suppress contamination of dust to inside of the optical unit 12 on the factory floor to a minimum.

In addition, the internal space 31 of the housing is closed from outside by the cover member 32, and the inside of the clean bench 20 is in communication with the internal space 31 via the communication opening 22; therefore, the humidity and temperature inside of the clean bench 20 and the internal space of the housing 11 further approach the same state. Therefore, it is possible to more finely manage the humidity inside of the clean bench 20 which is in communication with the internal space 31 of the housing 11 by way of the air conditioner 14 attached to the fiber laser oscillator 10.

In the validation of the optical fiber, temperature measurement of the optical fiber is performed by thermography (not illustrated) through the opening 62, and the existence of abnormalities in the established optical fiber is confirmed, in a state in which the second panel 60 and cover member 32 are installed to the fiber laser oscillator 10 to which the clean bench 20 is mounted. Therefore, it becomes possible to perform validation of the components inside on the factory floor in the field, while opening the tabletop of the optical unit 12.

FIG. 5 is a block diagram schematically showing a part of the electrical configuration of the fiber laser oscillator 10 mounting the clean bench 20. In the present embodiment, control for preventing failure caused by condensation is performed based on the detected values of the humidity-temperature sensor 90.

The control part 70 is a computer that performs various controls on the fiber laser oscillator 10. The control part 70 of the present embodiment monitors the humidity inside of the clean bench 20, and performs humidity control on the inside of the clean bench 20.

As shown in FIG. 5, the control unit 70 of the present embodiment includes a humidity control part 71, output command part 72, dew-point temperature calculation part 73, and alarm detection part 74.

Humidity information for inside of the clean bench 20 detected by a humidity detection part 91 of the humidity-temperature sensor 90 is sent to the humidity control part 71 and dew-point temperature calculation part 73. In addition, temperature information for the inside of the clean bench 20 detected by a temperature detection part 92 of the humidity-temperature sensor 90 is sent to the dew-point temperature calculation part 73.

The humidity control part 71 adjusts the humidity inside of the clean bench 20 by controlling the air conditioner 14 based on the humidity information for the inside of the clean bench 20. In the present embodiment, the humidity is controlled using the air conditioner 14 so as not to exceed a permitted value set in advance. It is thereby possible to prevent component failure due to condensation occurring inside of the optical units 12.

The output command part 72 is connected to a laser power supply 80, and controls the operating and stopping of the optical units 12.

The dew-point temperature calculation part 73 calculates the dew-point temperature based on the humidity information and temperature information for inside of the clean bench 20. The dew-point temperature information calculated by the dew-point temperature calculation part 73 is sent to the alarm detection part 74.

The alarm detection part 74 determines whether or not being a state in which condensation will occur based on the dew-point temperature calculated by the dew-point temperature calculation part 73, and interrupts the laser output command in the case of approaching a temperature at which condensation will occur inside of the clean bench 20. It is thereby possible to reliably prevent a situation in which the fiber laser oscillator 10 is run in an environment such that condensation would occur inside of the optical units 12, and component failure occurs.

The following such effects are exerted according to the clean bench 20 and the fiber laser oscillator 10 mounting this of the above explained embodiment. The fiber laser oscillator 10 of the present embodiment includes the housing 11 that accommodates the optical unit 12 to be able to be drawn out, and the clean bench 20 which is detachable to the side of the optical unit 12 and forms a closed space isolated from outside, above the optical unit 12 drawn out from the housing 11, in which a communication opening 22 that is in communication with the internal space 31 of the housing 11 is formed in the clean bench 20.

By mounting the detachable clean bench 20 onto the optical unit 12, it is thereby possible to easily prepare an environment in which replacement of the optical unit 12 or optical components built into the optical unit 12 can be efficiently performed, while contamination of dust to inside of the optical units 12 is prevented, even under a field environment with an abundance of dust or moisture. Not only the fusion process, but it is possible to use in efficient maintenance work, so far as dismantling and construction of optical fibers, replacement work of the optical unit 12 and optical components, and verification processes after fusion, and it is possible to effectively improve the workability of the fiber laser oscillator 10. In addition, the humid environments inside of the housing 11 of the fiber laser oscillator 10 and inside the clean bench 20 tend to become uniform by the communication opening 22, and thus humidity management is easily performed; therefore, it is possible to effectively prevent failure of optical components due to the occurrence of condensation, and thus reliability also improves. For example, it becomes possible to perform dehumidification inside of the optical unit 12 in a state drawing out the optical unit 12. Therefore, even under an environment with an abundance of humidity, work to start the oscillator while preventing component failure due to the occurrence of condensation, and validation of optical components becomes possible. In addition, by making a configuration enabling to detach the clean bench 20, since it becomes a light-weight clean bench enabling carrying to the factory floor in the field, the construction of optical fibers or installation of optical components performed in a clean room of a factory, and the fusion process of optical fibers can be performed on the factory floor in the field, and thus it is possible to favorably perform maintenance replacement work on the optical unit 12 or optical components built into the optical unit 12.

In addition, the fiber laser oscillator 10 of the present embodiment includes the humidity detection part 91 that detects the humidity inside of the clean bench 20, and the control unit 70 that determines whether the fiber laser oscillator 10 is operable based on the detection value of the humidity detection part 91.

It is thereby possible to reliably prevent a situation in which the fiber laser oscillator 10 operates in a state in which condensation will occur and optical components, etc. will fail, by managing the humidity inside of the clean bench 20.

In addition, the fiber laser oscillator 10 of the present embodiment includes the base plate 13 which fixes the optical unit 12, and can be drawn out from the housing 11, in which the clean bench 20 is installed to the base plate 13.

Since it is not a state in which the clean bench 20 is directly mounted to the optical unit 12, it is thereby possible to detach the tabletop of the optical unit (fiber laser module, beam combiner, etc.) 12 after arranging the clean bench 20, and the contamination of dust to inside thereof can be reliably prevented.

In addition, the clean bench 20 of the present embodiment has the visible light transmission plate 51. It is thereby possible to perform various kinds of work while confirming the inside of the clean bench 20 through the visible light transmission plate 51, while maintaining a clean environment by way of the clean bench 20.

In addition, the clean bench 20 of the present embodiment has the curtain part 52 configured by a material that is visible light transmissive, which is a material having flexibility, at an outside surface differing from a portion contacting the housing 11.

It is thereby possible to perform the fusion process using a fusion machine, etc. and maintenance work, while inserting a hand and/or implement inside of the clean bench 20 from the curtain part 52 having visible light transmissivity and confirming the state inside, while maintaining the clean environment by way of the clean bench 20.

In addition, the clean bench 20 of the present embodiment is configured to be able to arrange the external shelf 25 at the outside as well as being configured to be able to arrange the internal shelf 26 inside thereof. It is thereby possible to place a fusion machine on the internal shelf 26, or place a tool for maintenance on the external shelf 25 in the field of the factory floor, and thus the workability during component replacement can be remarkably improved.

Although a preferred embodiment of the present invention is explained above, the present invention is not to be limited to the aforementioned embodiment, and modifications are possible as appropriate. For example, in the above-mentioned embodiment, the humidity control part 71 is a configuration that performs humidity management based on the humidity information for inside of the clean bench 20; however, it may be made a configuration that performs humidity management by considering the dew-point temperature information calculated by the dew-point temperature calculation part 73.

EXPLANATION OF REFERENCE NUMERALS 10 fiber laser oscillator
11 housing
12 optical unit
20 clean bench
22 communication opening 25 external shelf
26 internal shelf
51 visible light transmission plate (visible light transmissive part)
52 curtain part
70 control unit
91 humidity detection part

What is claimed is:

1. A fiber laser oscillator including an optical unit which has a fusion splicing part in which optical fibers are to be joined, the fiber laser oscillator comprising:
a housing that accommodates the optical unit such that the optical unit is able to be drawn out of the housing; and
a clean bench that is detachable to the housing or a side of the optical unit, and defines a closed space which is isolated from outside,
wherein:
a communication opening that is in communication with an internal space of the housing is defined in the clean bench,
the optical unit is able to move in and out of the housing independently of the clean bench,
the clean bench is above the optical unit in a first state in which the optical unit is drawn out from the housing, and
the clean bench is removed from the housing in a second state in which the optical unit is inside the housing.

2. The fiber laser oscillator according to claim 1, further comprising:
a humidity detection part configured to detect humidity inside of the clean bench; and
a control unit configured to determine whether the fiber laser oscillator is operable based on a detection value of the humidity detection part.

3. The fiber laser oscillator according to claim 1, further comprising a base plate configured to fix the optical unit,
wherein:
the base plate can be drawn out from the housing, and
the clean bench is attached to the base plate.

4. The fiber laser oscillator according to claim 1, wherein the clean bench has a visible light transmissive part.

5. The fiber laser oscillator according to claim 1, wherein the clean bench has a curtain part constituted by a material that is visible light transmissive and flexible, at an outside surface which is different from a portion in contact with the housing.

6. The fiber laser oscillator according to claim 1, wherein the clean bench is able to have a shelf disposed at an interior or exterior thereof.

7. A clean bench that is detachable to a fiber laser oscillator including an optical unit having a fusion splicing part in which optical fibers are to be joined and a housing that accommodates the optical unit such that the optical unit is able to be drawn out of the housing,
wherein:
the clean bench defines a closed space isolated from outside,
a communication opening that communicates with an internal space of the housing is defined in the clean bench,
the optical unit is able to move in and out of the housing independently of the clean bench,
the clean bench is above the optical unit in a first state in which the optical unit is drawn out from the housing, and
the clean bench is removed from the housing in a second state in which the optical unit is inside the housing.

8. The fiber laser oscillator according to claim 1, further comprising an air conditioner,
wherein:
the air conditioner is positioned at the housing, and
the air conditioner is configured to perform:
air-conditioning inside of the housing, and
air-conditioning inside of the clean bench through the communication opening.

9. The fiber laser oscillator according to claim 8, wherein the air conditioner is further configured to perform dehumidification inside of the optical unit in the first state in which the optical unit is drawn out from the housing.

10. The clean bench according to claim 7, wherein:
an inside of the housing is configured to be air-conditioned by an air conditioner, and
an inside of the clean bench is configured to be air-conditioned by the air conditioner through the communication opening.

11. The clean bench according to claim 10, wherein an inside of the optical unit is configured to be dehumidified by the air conditioner in the first state in which the optical unit is drawn out from the housing.

* * * * *